US007821683B2

United States Patent
Ito et al.

(10) Patent No.: US 7,821,683 B2
(45) Date of Patent: Oct. 26, 2010

(54) DOCUMENT TRANSPORT DEVICE AND IMAGE FORMING APPARATUS

(75) Inventors: Takuya Ito, Kanagawa (JP); Hiroatsu Kazama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1045 days.

(21) Appl. No.: 11/446,402

(22) Filed: Jun. 5, 2006

(65) Prior Publication Data

US 2007/0146825 A1  Jun. 28, 2007

(30) Foreign Application Priority Data

Dec. 26, 2005  (JP) .............................. 2005-371764

(51) Int. Cl.
*H04N 1/04* (2006.01)
*B65H 5/22* (2006.01)

(52) U.S. Cl. ........................ 358/496; 358/498; 271/3.14

(58) Field of Classification Search ................ 358/443, 358/507, 400, 401, 408, 448, 452, 468, 474, 358/475, 501, 496, 497, 498; 355/407, 408, 355/47, 48; 271/3.08, 3.14, 3.18, 8.1; 382/295, 382/296, 297, 298, 312, 318
See application file for complete search history.

(56) References Cited

U.S. PATENT DOCUMENTS 6,320,674 B1 *  11/2001  Soma et al. ................... 358/1.9
6,636,720 B2 *  10/2003  Fujii et al. .................... 399/382
7,097,297 B2 *  8/2006  Hasebe et al. ................ 347/102
7,275,799 B2 *  10/2007  Hayashi et al. ................ 347/19
2001/0021036 A1 *  9/2001  Nimura et al. ............. 358/1.12
2003/0025949 A1 *  2/2003  Wang ......................... 358/500
2004/0246290 A1 *  12/2004  Hayashi et al. ................ 347/19
2005/0271445 A1 *  12/2005  Hanada et al. ............... 400/621
2006/0024113 A1 *  2/2006  Saito et al. ................... 400/578
2006/0062615 A1 *  3/2006  Horio .......................... 399/374
2006/0075909 A1 *  4/2006  Hoshi et al. .................. 101/114
2006/0139385 A1 *  6/2006  Akiyama et al. ............... 347/9
2006/0202646 A1 *  9/2006  Kojima ......................... 318/34
2007/0090586 A1 *  4/2007  Ohnishi et al. ............. 271/9.01

FOREIGN PATENT DOCUMENTS

JP  A-59-149245  8/1984
JP  A-2004-142865  5/2004

* cited by examiner

*Primary Examiner*—Jerome Grant, II
(74) *Attorney, Agent, or Firm*—Morgan, Lewis & Bockius LLP

(57) ABSTRACT

A document transport device includes a transport unit that transports documents one by one to a position where an image is read by an image reading unit and transports the document at a speed at which the image reading unit can read the image at the image reading position, and a controller that determines, based on an instruction from an image forming apparatus to which the document transport device is mounted, the number of sheets transported per unit time when plural documents are transported by the transport unit, and controls the transport unit to transport the documents at the determined number of sheets transported per unit time.

12 Claims, 5 Drawing Sheets under the US 7,821,683 B2

DOCUMENT TRANSPORT DEVICE AND IMAGE FORMING APPARATUS

The entire disclosure of Japanese Patent Application No. 2005-371764 filed on Dec. 26, 2005 including specification, claims, drawings and abstract is incorporated herein by reference in its entirety.

BACKGROUND (1) Technical Field

The present invention relates to a document transport device and an image forming apparatus.

(2) Related Art

An image forming apparatus, such as a copying machine, includes, for example, a document transport device called an ADF (Auto Document Feeder). The document transport device transports a document placed on a document tray to a position where image reading is performed by a CCD (Charge Coupled Device), and transports it at a speed at which the CCD can read the image at the image reading position. When the reading of the image is ended, the document is discharged to a paper discharge tray.

Recently, there is a case where a document transport device is prepared as an option device mountable to an image forming apparatus body. Although an image formation speed (that is, the number of record sheets on which images are formed per unit time) of an image forming apparatus varies according to the type thereof, when the image forming apparatus operates at an image formation speed not higher than a document transport speed (that is, the number of documents transported per unit time) of a document transport device, the document transport device can be mounted. However, in the case where an image forming apparatus having a low image formation speed is mounted with a document transport device having a document transport speed higher than that, since the document transport device transports a document at the high document transport speed as compared with the image formation speed, the so-called over-specification occurs, and there are problems that a noise generated from the document transport device becomes large, and a component of the document transport device readily reaches the end of its life.

SUMMARY

The present invention has been made in view of the above circumstances and provides a document transport device and an image forming apparatus.

According to an aspect of the invention, there is provided a document transport device including a transport unit that transports documents one by one to a position where an image is read by an image reading unit and transports the document at a speed at which the image reading unit can read the image at the image reading position, and a controller that determines, based on an instruction from an image forming apparatus mounted with the document transport device, the number of sheets transported per unit time when plural documents are transported by the transport unit, and controls the transport unit to transport the documents at the determined number of sheets transported per unit time.

BRIEF DESCRIPTION OF THE DRAWINGS

Exemplary embodiments of the invention will be described in detail based on the following figures, wherein.

DETAILED DESCRIPTION

Figure 1:
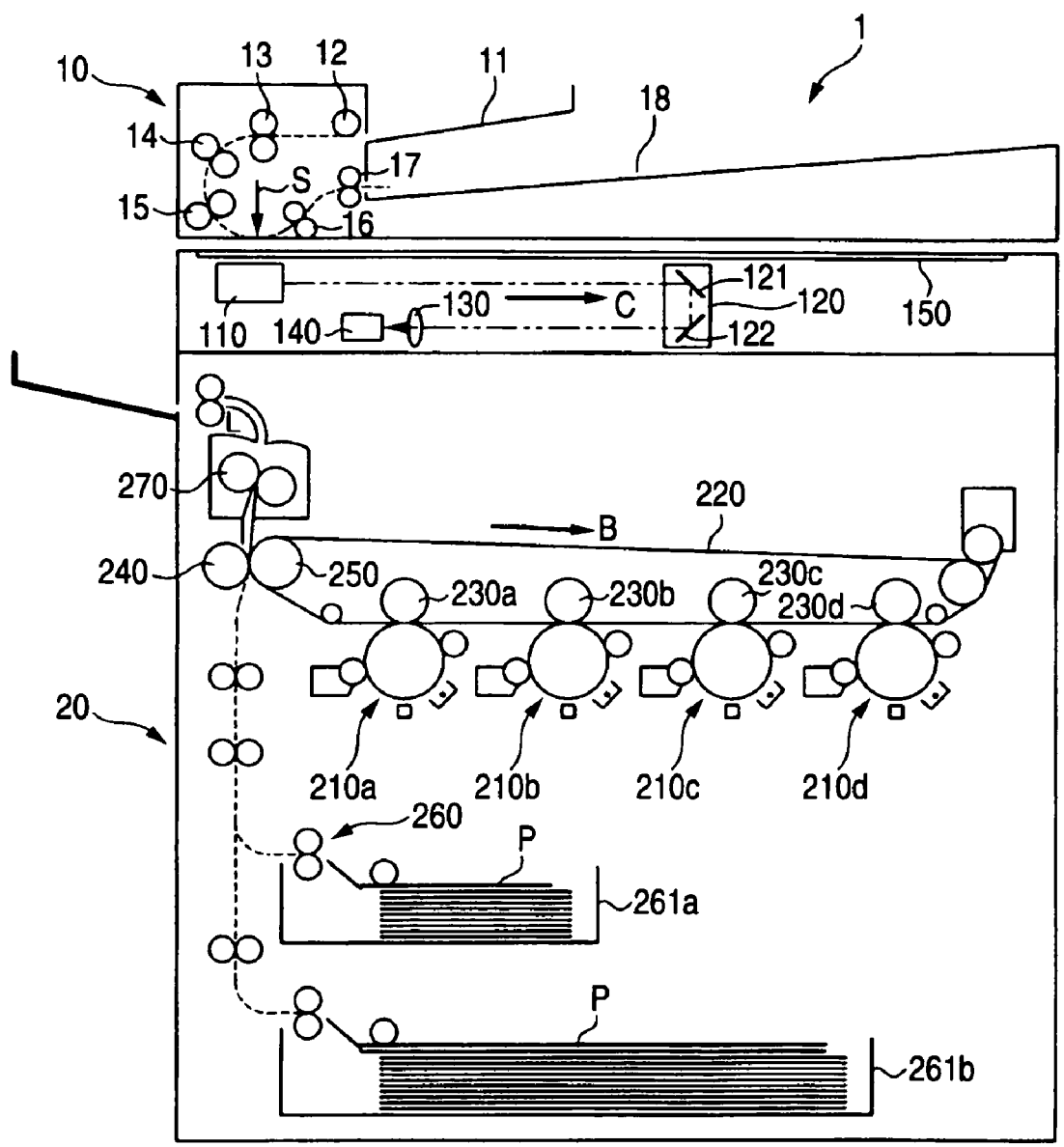
FIG. 1 is a sectional view showing a structure of an image forming apparatus.

FIG. 1 is a sectional view showing a structure of an image forming apparatus 1. As shown in FIG. 1, the image forming apparatus 1 includes an ADF 10 as a document transport device and an apparatus body 20. The ADF 10 can be detached/attached from/to an upper surface of the apparatus body 20, and can be further opened/closed using, as a fulcrum, a not-shown hinge tool provided at the depth side in the depth direction of the paper. When the ADF 10 is raised upward (opened), a platen glass 150 provided on the upper surface of the apparatus body 20 is exposed. The image forming apparatus 1 can read an image from a document pulled in by the ADF 10, or can read an image from a document placed on the platen glass 150 by the user.

The ADF 10 includes a document tray 11, a pickup roller 12, transport rollers 13 to 16, a discharge roller 17, and a paper discharge tray 18. The pickup roller 12, the transport rollers 13 to 16, and the discharge roller 17 function as a transport part (see FIG. 2 described later) to transport a document. When scan (reading of an image) is instructed by the user in a state where documents are placed on the document tray 11, the documents are pulled one by one into the inside of the ADF 10 by the pickup roller 12. The pulled-in document is transported by the transport rollers 13 to 15 to an image reading position S where an after-mentioned image reading part reads an image, and is transported at a constant speed at which the image reading part can read the image at the image reading position S. When the reading of the image is ended, the document is discharged to the paper discharge tray 18 by the transport roller 16 and the discharge roller 17.

The image reading part is provided above the apparatus body 20. The image reading part includes a full rate carriage 110, a half rate carriage 120, an imaging lens 130, a line sensor 140, and the platen glass 150. The half rate carriage 120 includes mirrors 121 and 122, and leads light from the full rate carriage 110 to the imaging lens 130. The imaging lens 130 is provided on an optical path connecting the mirror 122 and the line sensor 140, and forms an image of the reflected light from the document at the position of the line sensor 140. The line sensor 140 is, for example, a CCD image sensor having plural lines and on-chip color filters, and generates and outputs an image signal corresponding to the intensity of the imaged light.

Under the above structure, light is irradiated from a light source 111 to the document pulled in by the ADF 10, and the reflected light is read by the line sensor 140. The line sensor 140 generates the image signal based on the read reflected light. A specified image processing is applied to the image signal and image data is generated. Based on the generated image data, a toner image is formed on a record sheet in a manner as described below. Image forming units 210a, 210b, 210c and 210d correspond to the respective colors of Y (yellow), M (magenta), C (cyan) and K (black). An intermediate transfer belt 220 is an endless belt member moved in an arrow B direction in the drawing by a not-shown drive unit. Primary transfer rollers 230a, 230b, 230c and 230d are urged toward photoconductor drums of the image forming units 210a, 210b, 210c and 210d through the intermediate transfer belt 220. Toner images of the respective YMCK colors based on the image data are formed on the photoconductor drums, and the toner images are transferred onto the intermediate transfer belt 220. A secondary transfer roller 240 and a backup roller 250 are urged against each other at a position where the intermediate transfer belt 220 faces a record sheet P, and the toner image is transferred from the intermediate transfer belt 220 to the record sheet P. A paper feed mechanism 260 includes trays 261a and 261b containing various record sheets P, and supplies these record sheets P at the time of image formation. A fixing mechanism 270 includes a roller member for heating and pressurizing the record sheet P, and fixes the toner images transferred on the surface of the record sheet P by heat and pressure. In this way, the toner images are formed on the record sheet.

Figure 2:
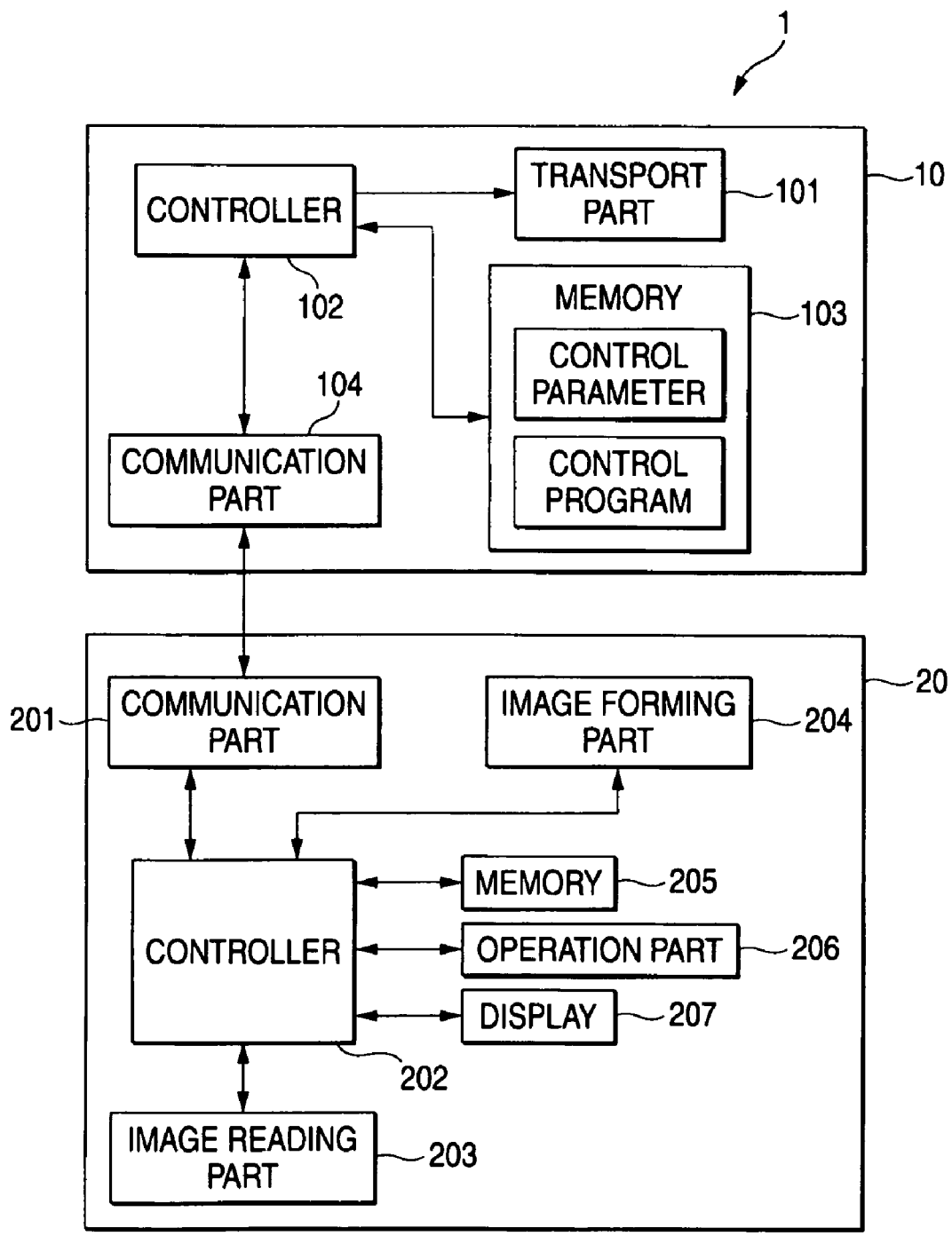
FIG. 2 is a block diagram showing a functional structure of the image forming apparatus.

FIG. 2 is a block diagram showing a functional structure of the image forming apparatus 1.

First, the ADF 10 will be described. A transport part 101 including the pickup roller 12, the transport rollers 13 to 16, and the discharge roller 17 is controlled by a controller 102 such as a CPU. A memory 103 stores control parameters to indicate a transport speed of a document, a timing of transport start and stop of the document, an acceleration at a time when the transport speed of the document is accelerated to a specified speed, or a timing of start and stop of the acceleration, and a control program describing a procedure in which the controller 102 uses these parameters to execute the transport control of the transport part 101. A communication part 104 is connected to a communication part 201 of the apparatus body 20, and gives and receives data to and from the communication part 201 in accordance with an instruction from the controller 102.

Next, the apparatus body 20 will be described. The communication part 201 is connected to the communication part 104 of the ADF 10, and gives and receives data to and from the communication part 104 in accordance with an instruction from a controller 202. The controller 202 includes a CPU, an ASIC (Application Specific Integrated Circuit), an LSI (Large Scale Integration) and the like, applies a specified image processing to an image signal generated by an above-mentioned image reading part 203 to generate image data, and outputs it to an image forming part 204. The image forming part 204 includes an apparatus group to control the image formation, including the image formation units 210a, 210b, 210c and 210d and the like, and forms the toner images on the record sheet based on the image data. A memory 205 stores data and programs required by the controller 202 to control all the image forming apparatus 1. An operation part 206 is a unit to receive an operation from the user. The user uses this operation part and can specify, for example, an operation mode of the image forming apparatus 1. The "operation mode" here is an operation mode (noise reduction mode) to reduce noise, or an operation mode (electric power reduction mode) to reduce electric power consumption. A display 207 displays a guide screen and various information in accordance with instructions from the controller 202.

In this exemplary embodiment, instructions are given from the apparatus body 20 to the ADF 10, so that the ADF 10 makes an adjustment such that the number of sheets transported per unit time in the ADF itself becomes almost equal to the number of sheets image-formed per unit time in the apparatus body 20. Further, in view of the content of the operation mode instructed from the apparatus body 20 as well, a transport pattern to realize the number of sheets transported per unit time is determined. The "transport pattern" here means a transport method indicated by a transport speed of a document, a timing of transport start and stop of the document, an acceleration at a time when the transport speed of the document is accelerated to a specified speed, or a timing of start and stop of the acceleration. For example, when the operation mode instructed from the apparatus body 20 is the noise reduction mode, the transport pattern of the ADF 10 is made a transport pattern in which the noise is low. When the operation mode instructed from the apparatus body 20 is the electric power reduction mode, the transport pattern of the ADF 10 is made a transport pattern in which the electric power consumption is low.

Next, a specific operation example will be described.

Figure 3:
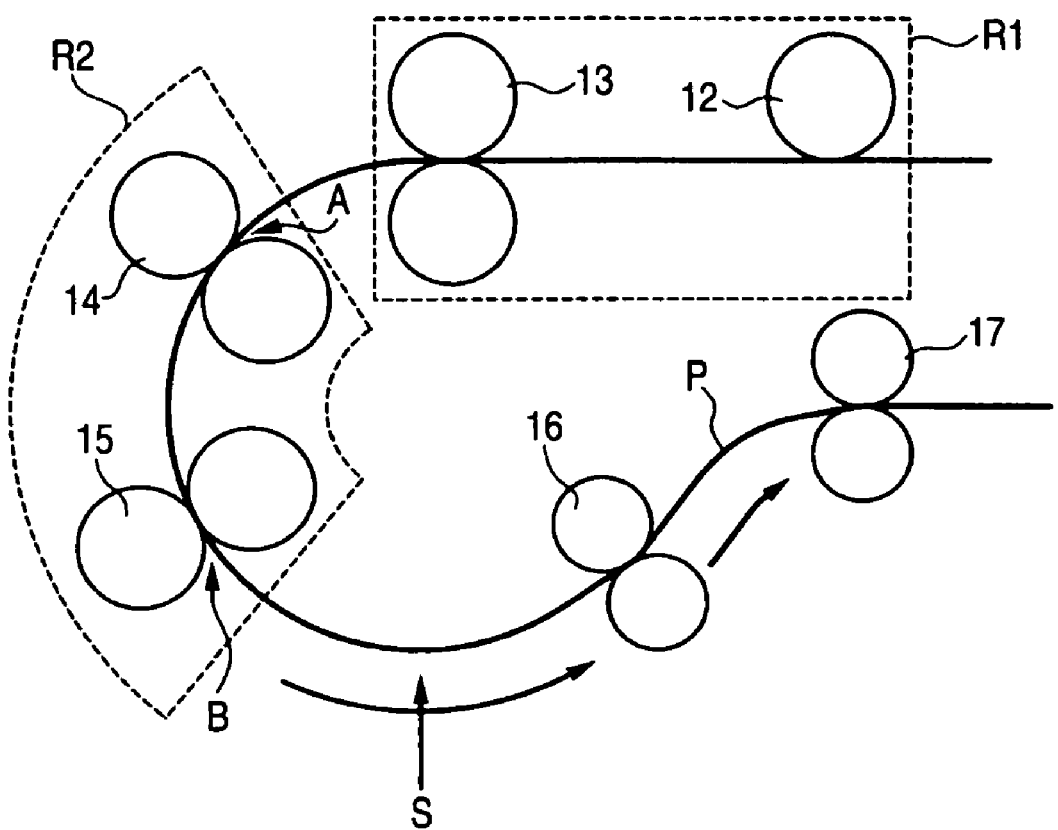
FIG. 3 is an enlarged view of a main part of an ADF of FIG. 1.

FIG. 3 is an enlarged view of a main part of the ADF 10 of FIG. 1. A transport path from the pickup roller 12 to a nip part of the transport roller 13 is a portion where the document P placed on the document tray 11 is pulled in, and is hereinafter referred to as a pulled-in transport portion R1. A transport path from a nip part A of the transport roller 14 to a nip part B of the transport roller 15 is a portion where the pulled-in document P is transported to an image reading position S, and is hereinafter referred to as an intermediate transport portion R2.

Figure 4:
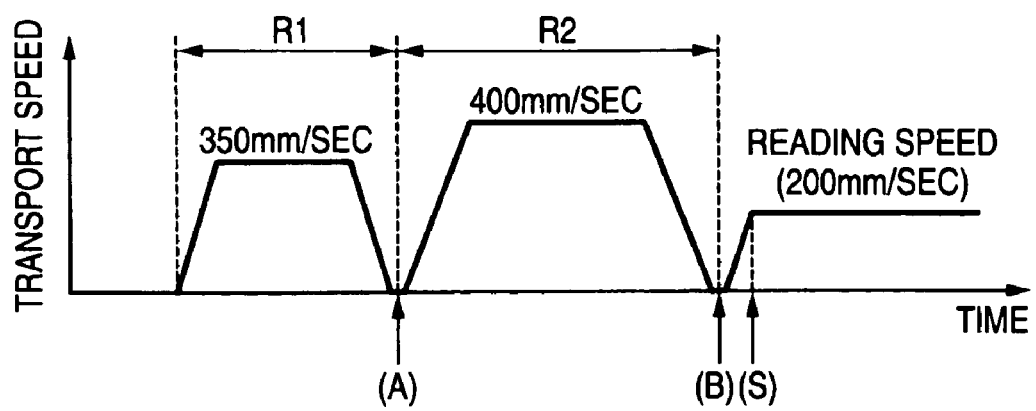
FIG. 4 is a view showing a relationship between the time since the transport of a document was started in the ADF and the transport speed.

First, a description will be given to a case where the controller 202 of the apparatus body instructs that the number of sheets image-formed per unit time is "50 sheets/minute", the image reading speed is "200 (mm/sec)", and the operation mode is not particularly specified (that is, it is, so to speak, a high production mode in which neither the noise nor the electric power consumption is required to be reduced). In this case, the instruction from the controller 202 is transmitted to the communication part 104 of the ADF 10 by the communication part 201, and the controller 102 of the ADF 10 receives this instruction through the communication part 104. The controller 102 reads the control program of the memory 103, and determines the transport pattern conforming to the instruction and the number of sheets transported per unit time. The number of sheets transported per unit time becomes [50 sheets/minute] equal to the number of sheets image-formed per unit time in the apparatus body 20. The transport pattern to realize the number of sheets transported per unit time [50 sheets/minute] becomes as shown in FIG. 4. The controller 102 stores the control parameter to realize the number of transported sheets and the transport pattern (that is, the control parameter to indicate the transport speed of the document, the timing of the transport start and stop of the document, the acceleration at the time when the transport speed of the document is accelerated to a specified speed, or the timing of the start and stop of the acceleration) into the memory 103. The controller 102 uses the control parameter stored in the memory 103 and executes a transport control described below.

FIG. 4 is a view showing a relationship between the elapsed time since the transport of the document was started in the ADF 10 and the transport speed. When the leading edge of the document is in the pulled-in transport portion R1, the transport speed is rapidly accelerated to 350 (mm/sec), and after the document is transported at 350 (mm/sec) for a fixed period, it is once stopped at the time point when the leading edge of the document reaches the nip part A of the transport roller 14. Next, when the leading edge of the document approaches the intermediate transport portion R2, the transport speed is rapidly accelerated to 400 (mm/sec), and after the document is transported at 400 (mm/sec) for a fixed period, it is again stopped at the time point when the leading edge of the document reaches the nip part B of the transport roller 15. Then, it is gradually accelerated and when the leading edge of the document reaches the image reading position S, the document is transported at a transport speed of 200 (mm/sec) equal to the image reading speed, and is discharged to the paper discharge tray 18. The above transport process is repeatedly executed for each sheet of the documents. As stated above, in the ADF 10, since the document is transported at the relatively high transport speed, such as 350 (mm/sec) and 400 (mm/sec), and the rapid acceleration, the relatively large number of transported sheets (the number of image-formed sheets), such as 50 sheets/minute, can be realized. Incidentally, the transport speed of the document, the timing of the transport start and stop of the document, the acceleration at the time when the transport speed of the document is accelerated to the specified speed, or the timing of the start and stop of the acceleration is regulated by the foregoing control parameter (the same applies to the following description).

Figure 5:
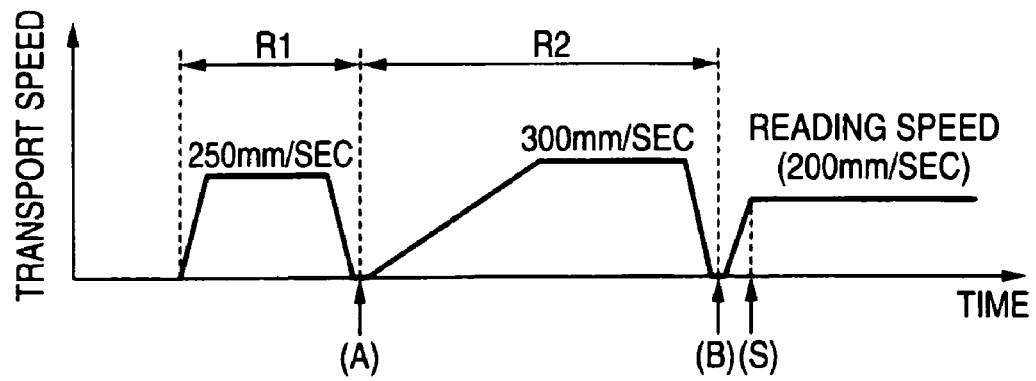
FIG. 5 is a view showing a relationship between the time since the transport of a document was started in the ADF and the transport speed.

Next, FIG. 5 is a view for explaining a transport pattern in a case where the controller 202 of the apparatus body instructs that the number of sheets image-formed per unit time is "35 sheets/minute", the image reading speed is "200 (mm/sec)", and the operation mode is the "noise reduction mode". In this case, when the leading edge of the document is in the pulled-in transport portion R1, the transport speed is rapidly accelerated to 250 (mm/sec), and the document is once stopped at the nip part A of the transport roller 14. Next, when the leading edge of the document approaches the intermediate transport portion R2, it is relatively slowly accelerated to 300 (mm/sec), and is again stopped at the nip part B of the transport roller 15. Then, the document is gradually accelerated and when the leading edge of the document approaches the image reading position S, it is transported at a transport speed of 200 (mm/sec) equal to the image reading speed, and is discharged to the paper discharge tray 18. The above transport process is repeatedly executed for each sheet of the documents. As stated above, in the ADF 10, since the document is transported at the relatively low transport speed, such as 250 (mm/sec) and 300 (mm/sec), the relatively small number of transported sheets (the number of image-formed sheets), such as 35 sheets/minute, can be realized.

Besides, since the acceleration in the intermediate transport portion R2 is smaller than that of the case of FIG. 4, it also becomes possible to reduce the noise. The reason is as follows.

Figure 6A:
FIGS. 6A to 6D are views showing a situation in which the leading edge of a document goes into a nip part of a transport roller.
Figure 6A:
Figure 6B:
Figure 6B:
Figure 6C:
Figure 6C:
Figure 6D:

FIGS. 6A to 6D are views showing a situation in which the leading edge of the document goes into the nip part of the transport roller 14. In FIGS. 6A to 6D, first, the leading edge of the document D transported to the left in the drawing by the transport roller 13 is stopped in a state where it is in contact with the transport roller 14 (FIG. 6A). Thereafter, although the leading edge of the document D goes into the nip part A of the transport roller 14, first, since it does not smoothly go into the nip part, a small loop r is formed at the leading edge portion of the document (FIG. 6B). Although this loop r gradually becomes large (FIG. 6C), when the leading edge of the document D goes into the nip part of the transport roller 14 and the transport to the left in the drawing is started, this loop r gradually disappears (FIG. 6D). The noise generated when the loop r disappears at this time is relatively large. Accordingly, when the acceleration of the transport speed in the intermediate transport portion R2 by the transport roller 14 is made small, the loop r disappears very slowly, and as a result, the generation of the noise can be suppressed.

Although FIG. 5 shows the example in which the acceleration itself is decreased and the noise is reduced, the noise may be reduced by devising the timing of the start and stop of the acceleration.

Figure 7:
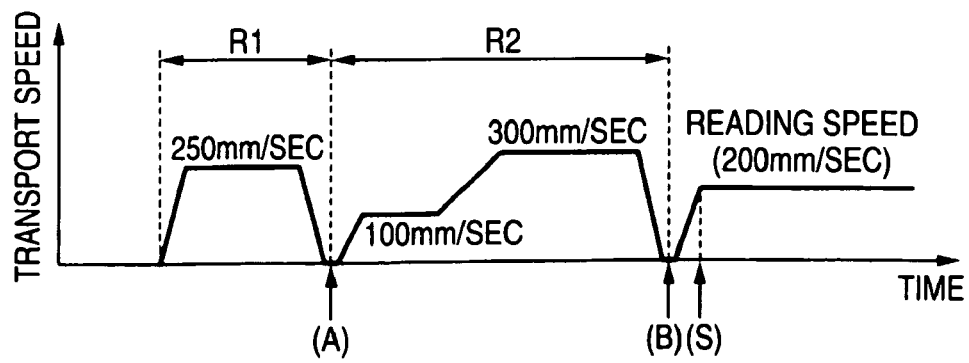
FIG. 7 is a view showing a relationship between the time since the transport of a document was started in the ADF and the transport speed.

FIG. 7 is a view for explaining a transport pattern in a case where similarly to the case of FIG. 5, the controller 202 of the apparatus body instructs that the number of sheets image-formed per unit time is "35 sheets/minute", the image reading speed is "1200 (mm/sec)", and the operation mode is the "noise reduction mode". In this case, when the leading edge of the document is in the pulled-in transport portion R1, the transport speed is rapidly accelerated to 250 (mm/sec), and the document is once stopped at the nip part A of the transport roller 14. Next, when the leading edge of the document approaches the intermediate transport portion R2, first, the document is relatively slowly accelerated until the transport speed becomes 100 (mm/sec), and when the transport speed becomes 100 (mm/sec), the transport speed is kept for a specified period. Next, the document is relatively slowly accelerated until the transport speed becomes 300 (mm/sec), and is again stopped at the nip part B of the transport roller 15. Then, the document is gradually accelerated and when the leading edge of the document approaches the image reading position S, it is transported at a transport speed of 200 (mm/sec) equal to the image reading speed, and is discharged to the paper discharge tray 18. The above transport process is repeatedly executed for each sheet of the documents. By adopting the acceleration method in which the acceleration is performed stepwise as stated above, the loop r formed in the document can be made to slowly disappear, and as a result, the generation of the noise can be suppressed.

Besides, in the case where the "electric power reduction mode" is instructed from the controller 202 of the apparatus body, a following transport pattern may be adopted. As described above, the document is stopped at the nip part A of the transport roller 14 and the nip part B of the transport roller 15. The stop time at this time is made long, and in order to realize the determined number of transported sheets, the transport speed in the pulled-in transport portion R1 and the intermediate transport portion R2 is increased. Although depending on the magnitude of the transport speed, when the stop time is made long, it is possible to expect the effect of suppressing the electric power consumption.

According to the exemplary embodiment described above, the instruction is given to the ADF 10 from the apparatus body 20, so that the number of sheets transported per unit time in the ADF 10 can be adjusted to become almost equal to the number of sheets image-formed per unit time in the apparatus body 20. Thus, with respect to plural kinds of apparatus bodies operating at different image formation speeds, it becomes possible to provide document transport devices to transport documents at transport speeds suitable to the image formation speeds. By this, it is possible to suppress the manufacturing cost of all the image forming apparatus and to simplify the manufacturing process. Further, based on the instruction of the operation mode from the apparatus body 20, it is possible to determine the optimum transport pattern to realize the number of sheets transported per unit time in the ADF 10. By this, it becomes possible to meet the user's request to reduce the noise or to reduce the electric power consumption.

Incidentally, the "transport pattern" may include at least a required one of the transport speed of the document, the timing of the transport start and stop of the document, the acceleration at the time when the transport speed of the document is accelerated to the specified speed, and the timing of the start and stop of the acceleration. Besides, in the exemplary embodiment, although the description has been made while the tandem system image forming part provided with the four image forming units is used as an example, the image forming part may be of a rotary system. Besides, a sheet transport belt is provided instead of the intermediate transfer belt, and transfer may be directly performed from the photoconductor drum to the document without performing the transfer onto the intermediate transfer body (intermediate transfer belt).

As described above, some exemplary embodiments of the invention are outlined below.

According to an aspect of the invention, a document transport device includes a transport unit that transports documents one by one to a position where an image is read by an image reading unit and transports the document at a speed at which the image reading unit can read the image at the image reading position, and a controller that determines, based on an instruction from an image forming apparatus to which the document transport device is mounted, the number of sheets transported per unit time when plural documents are transported by the transport unit, and controls the transport unit to transport the documents at the determined number of sheets transported per unit time.

Besides, according to another aspect of the invention, a document transport device includes a transport unit that transports documents one by one to a position where an image is read by an image reading unit and transports the document at a speed at which the image reading unit can read the image at the image reading position, and a controller that determines, based on an instruction from an image forming apparatus to which the document transport device is mounted, a transport pattern of the document transported by the transport unit and the number of sheets transported per unit time, and controls the transport unit to transport the documents at the determined number of sheets transported per unit time and in the determined transport pattern. The transport pattern may include at least one of a transport speed of a document, a timing of transport start and stop of the document, an acceleration at a time when the transport speed of the document is accelerated to a specified speed, and a timing of start and stop of the acceleration.

Besides, according to another aspect of the invention, an image forming apparatus includes the document transport device, a controller to give the instruction to the document transport device, and an image forming unit to form an image read from a document transported by the document transport device onto a record sheet.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document transport device comprising:
   a transport unit that transports documents one by one to a position where an image is read by an image reading unit and transports the document at a speed at which the image reading unit can read the image at the image reading position; and
   a controller that determines, based on an instruction from an image forming apparatus to which the document transport device is mounted, a transport pattern of the document transported by the transport unit and the number of sheets transported per unit time by the transport unit, and controls the transport unit to transport the documents at the determined number of sheets transported per unit time and in the determined transport pattern.

2. The document transport device according to claim 1, wherein the transport pattern includes at least one of a transport speed of a document, a timing of transport start and stop of the document, an acceleration at a time when the transport speed of the document is accelerated to a specified speed, and a timing of start and stop of the acceleration.

3. The document transport device according to claim 1, wherein the transport speed of the document by the transport unit, the timing of the transport start and stop of the document, the acceleration at the time when the transport speed of the document is accelerated to the specified speed, or the timing of the start and stop of the acceleration is indicated by a control parameter, and
   when the controller determines the transport speed of the document, the timing of the transport start and stop of the document, the acceleration at the time when the transport speed of the document is accelerated to the specified speed, or the timing of the start and stop of the acceleration, the controller controls the transport unit based on the control parameter indicating the determined content.

4. The document transport device according to claim 1, wherein the instruction from the image forming apparatus includes the number of sheets transported per unit time and mode information to indicate at least one of an operation mode to reduce noise and an operation mode to reduce electric power consumption, and
   the controller determines the transport pattern that the number of sheets transported per unit time included in the instruction is transported in the operation mode indicated by the mode information included in the instruction from the image forming apparatus.

5. The document transport device according to claim 4, wherein the controller determines an acceleration method in which an acceleration at a time when the transport speed of the document is accelerated to a specified speed is made low or acceleration is performed stepwise when the mode information included in the instruction from the image forming apparatus indicates the operation mode to reduce the noise.

6. The document transport device according to claim 4, wherein the controller prolongs a time from a timing of transport start of the document to a timing of stop when the mode information included in the instruction from the image forming apparatus indicates the operation mode to reduce the electric power consumption.

7. A document transport device comprising:
   a transport unit that transports documents one by one to a position where an image is read by an image reading unit and transports the document at a speed at which the image reading unit can read the image at the image reading position; and
   a controller that determines, based on an instruction from an image forming apparatus to which the document transport device is mounted, the number of sheets transported by the transport unit per unit time, and controls the transport unit to transport the documents at the determined number of sheets transported per unit time.

8. The document transport device according to claim 1, wherein the speed at which the document passes through the reading unit is constant.

9. An image forming apparatus comprising:
an image forming apparatus body comprising:
a first controller that give the instruction to a document transport device; and
an image forming unit that forms an image read from a document transported by the document transport device onto a record sheet,
the document transport device comprising:
a transport unit that transports documents one by one to a position where an image is read by an image reading unit and transports the document at a speed at which the image reading unit can read the image at the image reading position; and
a second controller that determines, based on an instruction from the image forming apparatus body to which the document transport device is mounted, the number of sheets transported per unit time by the transport unit, and controls the transport unit to transport the documents at the determined number of sheets transported per unit time.

10. The image forming apparatus according to claim 9, wherein the speed at which the document passes through the reading unit is constant.

11. An image forming apparatus comprising:
a document transport device including a transport unit that transports documents one by one to a position where an image is read by an image reading unit and transports the document at a speed at which the image reading unit can read the image at the image reading position, and a controller that controls the transport unit to transport the documents at the number of sheets transported per unit time by the transport unit based on an instruction from an image forming apparatus mounted with the document transport device; and
another controller that determines the number of sheets transported per unit time ef by the transport unit when the document transport device transports a plurality of documents, and gives the instruction to the document transport device.

12. The image forming apparatus according to claim 11, wherein the speed at which the document passes through the reading unit is constant.

* * * * *